SWITCHING AND MEMORY CIRCUIT COMPRISING SERIES FIELD EFFECT TRANSISTORS AND SILICON CONTROLLED RECTIFIERS

Filed Jan. 27, 1964

2 Sheets-Sheet 1

April 11, 1967 J. BOHM 3,313,953

SWITCHING AND MEMORY CIRCUIT COMPRISING SERIES FIELD EFFECT TRANSISTORS AND SILICON CONTROLLED RECTIFIERS

Filed Jan. 27, 1964 2 Sheets-Sheet 2

United States Patent Office 3,313,953
Patented Apr. 11, 1967

3,313,953
SWITCHING AND MEMORY CIRCUIT COMPRISING SERIES FIELD EFFECT TRANSISTORS AND SILICON CONTROLLED RECTIFIERS

John Bohm, Montreal, Quebec, Canada, assignor to Northern Electric Company Limited, Montreal, Quebec, Canada Filed Jan. 27, 1964, Ser. No. 340,171
8 Claims. (Cl. 307—88.5)

This invention relates to a circuit which can be switched to one or other of two stable states and which can be brought to the first state at one electrode and to the second at a separate other electrode. Current conduction in the circuit which establishes the two states does not run through these switching electrodes which may therefore be isolated from the conduction path. The circuit of the invention can take the place in many instances of a simple electro-mechanical relay and therefore will find use in apparatus where no moving parts with consequent absence of maintenance is desired.

The circuit of the invention also finds application as a memory and is particularly suitable for integrating into a counter for recording the number of pulses occurring in a train.

More particularly in accordance with the invention, there is provided a circuit which comprises, a switchable conducting device, said device having a conduction characteristic wherein its electrical resistance shows a sudden fall from a higher to a lower value at a given applied potential and remains at said lower value until current through said device falls below a given holding level, said characteristics being modified by trigger excitation to lower said given potential establishing the onset of said fall, a current pinch off device in series with said switchable device, and said pinch off device having a resistance which rises from a low to a higher resistance upon application of a pinch off excitation, a current source in series with said two devices, said source producing a potential across said switchable device below said given applied potential in the absence of said trigger excitation, but above said value in the presence of said trigger excitation, said source inducing a current through said devices of a magnitude greater than said holding current when said pinch off device is unexcited, said pinch off device having a resistance in the presence of said pinch off excitation sufficient to drop said current below said holding level, current through said circuit thence passing upon application of said trigger excitation, and subsequently being interrupted upon application of said pinch off excitation.

Figure 1:
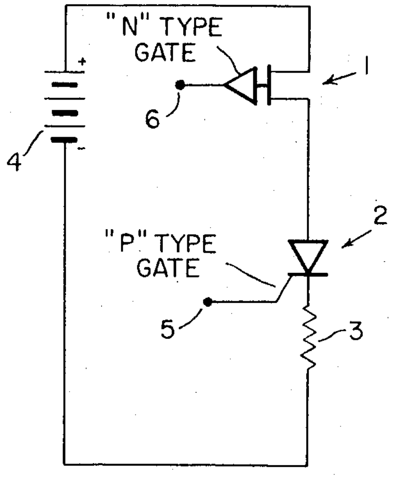
Figure 2:
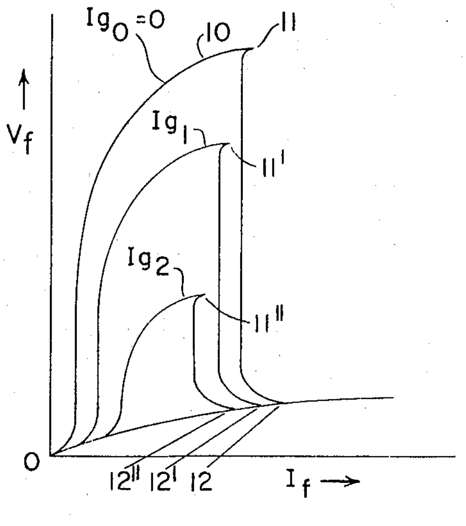
Figure 3:
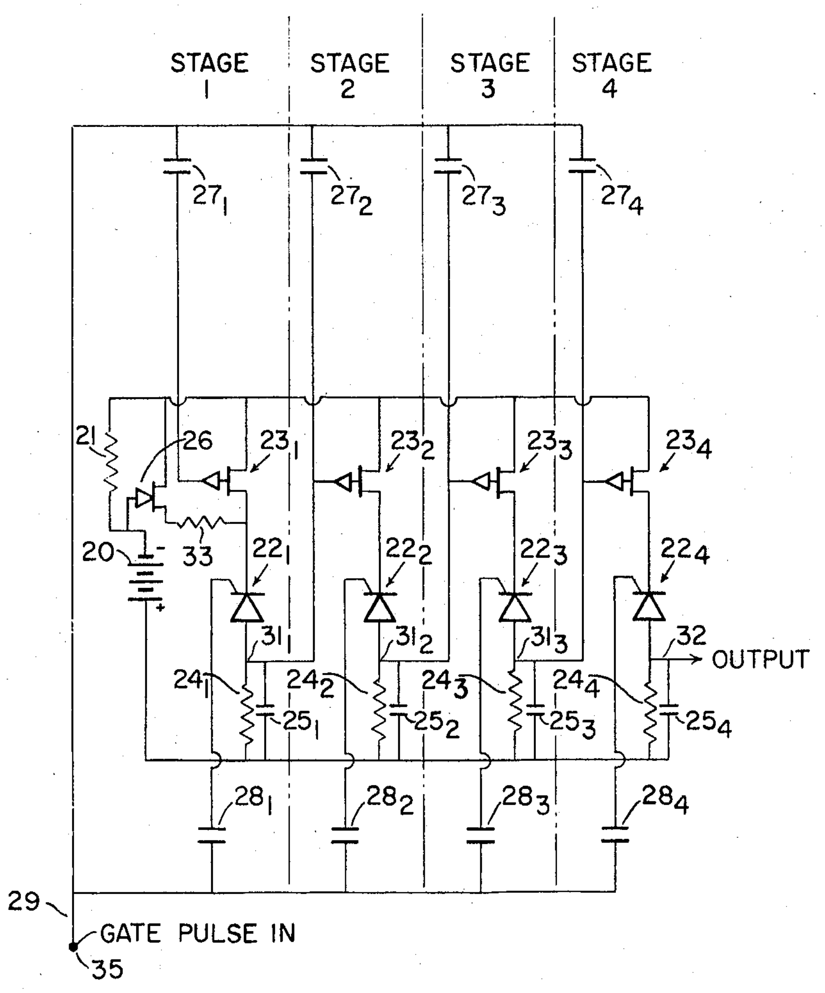

A description of the invention will now be made with reference to the accompanying drawings in which:

FIGURE 1 is a schematic circuit diagram of a circuit embodying the teachings of the invention, FIGURE 2 shows a graph of forward voltage against forward current for various gate currents of a four layer diode, and FIGURE 3 shows the integration of the circuit of FIGURE 1 into a four digit binary counting circuit.

Having reference first to FIGURE 1, a field effect transistor 1 is connected in series with a four layer diode or controlled rectifier 2, a load resistor 3, and a battery 4. The sense of connection of the diode 2 is such that the battery tends to pass current through it in its forward direction. In the circuit shown the four layer diode has a p-type gate whereas the field effect transistor 1 has an n-type gate.

Let us now briefly consider the conduction characteristics of a four layer diode with reference to FIGURE 2. If a potential difference is applied across this diode in the forward direction without any input to the gate (following curve $Ig_0=0$), there is very little increase in current with applied voltage until the region 10 is reached. At this state the current conduction increases rapidly with applied voltage until the break over point 11 is reached. The voltage drop across the device then becomes much smaller for a given current flow. If a bias current is applied to the gate then the device will follow the curves $Ig_1$, $Ig_2$, etc. (where $Ig$ represents the bias currents and where $Ig_0<Ig_1<Ig_2$). For a fairly high gate current the device behaves as a simple single junction rectifier. From these curves it can be seen that once the break-over point 11, 11′, or 11″ etc. is reached the device will remain in conduction provided the holding current represented by points 12, 12′ and 12″ for the several gate currents is maintained.

Returning now to the circuit of FIGURE 1, the voltage of the battery 4 is chosen so that with no bias on terminal 5 the voltage applied across the rectifier 2 is not sufficient to carry it beyond the breakover point. When however, a bias pulse is applied to terminal 5 the breakover point for that bias is exceeded and the device switches into conduction. Current will continue to pass through resistor 3 until such time as the battery voltage 4 is removed or until the current is reduced below the holding current for the rest bias of terminal 5. The current through the rectifier can be reduced by applying a reverse bias to the field effect transistor at terminal 6. With the polarity of FIGURE 1 a positive bias of suitable magnitude will serve to reduce or completely cut off conduction through the transistor and thus to throw diode 2 out of conduction.

It can therefore be seen that the application of a pulse to terminal 5 will put the circuit into conduction whereas the application of a similar pulse to terminal 6 will switch it off. This circuit can thus replace many D.C. relays with the additional advantage that no holding circuit is required.

Although, in the circuit shown, pulses of similar polarity have been required for switch on and switch off, the use of a field effect transistor with a p-type gate would have required a negative switch off pulse. By applying the input to the controlled rectifier onto the central n-type layer rather than the p-layer a negative pulse would have been required to switch on the diode. The circuit, is therefore, very flexible.

Having reference now to FIGURE 3, four conducting stages are shown arranged as a counter. Battery 20 provides energizing current through resistance 21 and each stage comprises four layer diode $\mathbf{22}_1$ to $\mathbf{22}_4$ each in series with its n-type gate field effect transistor $\mathbf{23}_1$ to $\mathbf{23}_4$ respectively. Each stage includes a resistor $\mathbf{24}_1$ to $\mathbf{24}_4$ shunted by a capacitor $\mathbf{25}_1$ to $\mathbf{25}_4$. The time constant of each resistor 24 and its capacitor 25 is of the same order as or greater than the duration of each of the gating pulses to be applied to the circuit. The field effect transistor $\mathbf{23}_1$ is shunted by a further field effect transistor 26 whose gate is of opposite polarity to that of $\mathbf{23}_1$, in this instance a p-type gate. The stages are all arranged so that the gates of each transistor 23, and the control electrodes of diodes 22 are fed independently through condensers $\mathbf{27}_1$ to $\mathbf{27}_4$ and $\mathbf{28}_1$ to $\mathbf{28}_4$ respectively from a common input pulse line 29. The junction $\mathbf{31}_1$ to $\mathbf{31}_3$ between each four layer diode 22, its respective resistor 24 and condenser 25 is connected to the input of the transistor 23 in the next stage. Thus junction $\mathbf{31}_1$ is connected to the input gate of transistor $\mathbf{23}_2$, $\mathbf{31}_2$ to the gate of $\mathbf{23}_3$, and $\mathbf{31}_3$ to the gate of $\mathbf{23}_4$.

Let us assume for the sake of argument that the first stage is switched on (so that diode $\mathbf{22}_1$ is passing current) and that a positive input pulse is applied to line 29. Current will be passing through resistor 21 and the value of this is chosen so that the consequent negative bias on the gate of transistor 26 is sufficient to cut off current flow through this transistor. The input pulse will be in the direction to cut off conduction through transistors 23 and thus to throw diodes 22 out of conduction. Since the pinching off effect will be to raise the resistance of transistors 23 so that any possible current which might flow through any of the diodes 22 will be below the holding current, diodes $22_3$ and $22_4$ will remain cut off. Diode $22_1$ will be switched off. However $22_2$ will be switched on since there was a voltage drop in resistor $24_1$ because of the earlier current flow through diode $22_1$, and condenser $25_1$ had become charged. The charge takes a definite time to discharge through resistor $24_1$ after diode $22_1$ has been cut off and the consequent negative potential on junction $31_1$ can be made to offset the positive pulse applied through condenser $27_2$ so that the gate of transistor $23_2$ is not carried to a current restricting or pinch off potential by the pulse. As long as the positive pulse is removed before the condenser $25_1$ discharges sufficiently for transistor $23_2$ to reduce the current through diode $22_2$ below the holding current the diode $22_2$ will be switched on and remains conducting.

The gating pulse applied to input 35 of line 29 has thus shifted conduction from the first stage of the register to the second stage. It is clear that the next input pulse will shift conduction to the third and the next to the fourth stage.

In the case where none of the stages is conducting, the application of an input pulse would fail to bring any of the stages into conduction unless it were for the presence of transistor 26. When none of the stages is conducting there is no voltage drop across the resistor 21 and therefore transistor 26 is free to pass current. Thus the application of an input pulse will switch on the four layer diode $22_1$ with an initial current path through transistor 26 and resistor 33. Resistor 33 is chosen so that the current is sufficient to keep $22_1$ on, but so that the voltage drop across resistor 21 is too low to turn transistor 26 off. As the input pulse is removed the current path to $22_1$ is maintained through $23_1$ and this current causes sufficient voltage drop across resistor 21 to turn transistor 26 off. Current through any subsequent stages will keep transistor 26 cut off.

The number of stages may be continued indefinitely at least up to the point at which the input impedance for the gating pulses becomes too small to handle. The output obtained can be used to provide a switching pulse to gate a second counter. It is useful to make a counter with 10 stages. Each counter will then represent one column of digits on the decimal scale. The output obtained when the last stage of FIGURE 3 conducts is in the negative direction as shown, but those skilled in the art will appreciate that there are several methods by which the phase of the output may be reversed if required. Alternatively, to reversal of output a subsequent counter may be made to operate on negative input pulses such as by constructing the four layer diodes with n-type gates and the field effect transistors with p-type gates.

Although a counter circuit has been shown here, the basic relay circuit may be applied to other memory arrangements which will be apparent to those skilled in the art. Of considerable advantage is that if desired each circuit may be turned on and off from a separate input and the working current conduction path is isolated from the control input path.

I claim:

1. A circuit which comprises, a first and a second switchable conducting device, each said device having a conduction characteristic wherein its electrical resistance shows a sudden fall from a higher to a lower value at a given applied potential and remains at said lower value until current through said device falls below a given holding level, a trigger electrode on each switchable device, said characteristic being modified by trigger excitation applied to said trigger electrode to lower said given potential establishing the onset of said fall, a first current pinch-off device in series with said first switchable device, a second current pinch-off device in series with said second switchable device, each said pinch-off device including a pinch-off electrode and having a resistance which rises from a low to a higher resistance upon application of a pinch-off excitation to said pinch-off electrode, means for connecting each said series connected switchable device and current pinch-off device across a direct current source, said source producing a potential across each said switchable device below said given applied potential in the absence of said trigger excitation, but above said value in the presence of said trigger excitation, said source inducing a current through each said switchable device of a magnitude greater than said holding current when its respective pinch-off device electrode is unexcited, each said pinch-off device having a resistance in the presence of said pinch-off excitation sufficient to drop current through its respective switchable device below said holding level, means for connecting said trigger electrodes on said first and second switchable devices and said pinch-off electrodes of said first and second pinch-off devices to a source of excitation current for triggering current conduction through said switchable devices and current pinch-off in said pinch-off devices in the presence of excitation from said excitation source, a load series connected with said first switchable device and said first pinch-off device, and means connecting said load and said pinch-off electrode of said second pinch-off device for applying an inhibiting potential to said pinch-off electrode of said second pinch-off device for preventing current pinch-off in said second pinch-off device when said first switchable device is conducting; a second load in series with said direct current source, a third pinch-off device connected in parallel with said first pinch-off device, said third pinch-off device including a pinch-off electrode and having a resistance which rises from a low to a higher resistance upon application of a pinch-off excitation to its pinch-off electrode, and means connecting said second load and said pinch-off electrode of said third pinch-off device for inhibiting current through said third current pinch-off device when either of said first and said second switchable devices is conducting.

2. A circuit as defined in claim 1 wherein said pinch off device comprises a field effect transistor including a conducting channel, the resistance of said channel being raised by establishment of potential difference between said pinch-off electrode and said channel.

3. A circuit as defined in claim 1 wherein said switchable device comprises a four layer diode.

4. A circuit as defined in claim 3, the trigger electrode of each said four layer diode being sensitive to trigger potential of a first polarity, each said first and second field effect transistors being of the junction gate type, the junction increasing resistance of its channel upon application of a potential of said first polarity to its gate electrode.

5. A circuit as defined in claim 4, said third field effect transistor being of the junction gate type, the junction of said third field effect transistor increasing resistance of its channel upon application of a potential to its gate electrode of polarity opposite to said first polarity.

6. A circuit which comprises, a first and a second switchable conducting device, each said device having a conduction characteristic wherein its electrical resistance shows a sudden fall from a higher to a lower value at a given applied potential and remains at said lower value until current through said device falls below a given holding level, a trigger electrode on each switchable device, said characteristc being modified by trigger excitation applied to said trigger electrode to lower said given potential establishing the onset of said fall, a first field effect transistor in series with said first switchable device, a second field effect transistor in series with said second switchable device, each said transistor including a conducting channel and a channel gate electrode, said channel having a resistance to current flow which rises from a low to a higher resistance upon application of gate excitation of chosen polarity to said channel gate electrode, current flow between the gate electrode and channel being negligible in presence of said gate excitation, means for connecting each said series connected switchable device and field effect transistor across a direct current source, said source producing a potential across each said switchable device below said given applied potential in the absence of said trigger excitation, but above said value in the presence of said trigger excitation, said source inducing a current to each said switchable device of a magnitude greater than said holding current when its respective field effect transistor gate electrode is unexcited, each said field effect transistor having a resistance in its channel in the presence of said gate excitation sufficient to drop current through its respective switchable device below said holding level, means for connecting said trigger electrodes of said first and second switchable devices and said gate electrodes of said field effect transistors to a source of excitation current for triggering current conduction through said switchable devices and current interruption in said field effect transistors in the presence of excitation from said excitation source, a load series connected with the first switchable device and the first field effect transistor, and means connecting said load and said gate electrode of said second field effect transistors for applying an inhibiting potential to said second field effect transistor for preventing current interruption in said second field effect transistor when said first switchable device is conducting.

7. A circuit as defined in claim 6, wherein each said switchable device comprises a four layer diode.

8. A circuit as defined in claim 7, the trigger electrode of each said four layer diode being sensitive to trigger potential of a first polarity, each said field effect transistor being of the junction gate type, the junction increasing resistance of its channel upon application of a potential of said first polarity to its gate electrode.

References Cited by the Examiner

UNITED STATES PATENTS

| | | | |
|---|---|---|---|
| 2,456,825 | 12/1948 | Fitch et al. | 315—340 |
| 2,460,455 | 2/1949 | Hurley | 315—340 |
| 2,942,160 | 6/1960 | Ricketts et al. | 328—84 |
| 3,018,392 | 1/1962 | Jones et al. | 307—88.5 |
| 3,132,264 | 5/1964 | Dahme | 307—88.5 |
| 3,168,649 | 2/1965 | Meyers | 307—88.5 |
| 3,181,071 | 4/1965 | Smith et al. | 307—88.5 |
| 3,192,441 | 6/1965 | Wright | 307—88.5 |
| 3,217,176 | 11/1965 | Chin | 307—88.5 |

OTHER REFERENCES

Solid State Products, Inc., A Survey of Some Basic Trigistor Circuits, application and circuit design note, Bulletin #D410–02, March 1960, pages 10–14 relied on.

ARTHUR GAUSS, *Primary Examiner.*

I. C. EDELL, R. H. EPSTEIN, *Assistant Examiners.*